(12) United States Patent
McFarland (10) Patent No.: US 9,884,637 B2
(45) Date of Patent: Feb. 6, 2018

(54) BARREL TRUCK

(76) Inventor: Greg McFarland, Astoria, NY (US)

( * ) Notice: Subject to any disclaimer, the term of this patent is extended or adjusted under 35 U.S.C. 154(b) by 969 days.

(21) Appl. No.: 13/604,805

(22) Filed: Sep. 6, 2012

(65) Prior Publication Data

US 2013/0094928 A1    Apr. 18, 2013

Related U.S. Application Data (60) Provisional application No. 61/547,929, filed on Oct. 17, 2011.

(51) Int. Cl.
| | | |
|---|---|---|
| *B62B 1/14* | (2006.01) | |
| *B62B 1/12* | (2006.01) | |
| *B62B 1/26* | (2006.01) | |

(52) U.S. Cl.
CPC .............. *B62B 1/14* (2013.01); *B62B 1/12* (2013.01); *B62B 1/264* (2013.01); *B62B 2202/02* (2013.01); *B62B 2203/10* (2013.01); *B62B 2205/104* (2013.01)

(58) Field of Classification Search
CPC ...... B62B 1/00–1/26; B62B 1/12; B62B 1/14; B62B 1/264; B62B 2202/02; B62B 2203/10; B62B 2205/104
USPC ................. 414/457, 445, 447, 490; 280/79.5
See application file for complete search history.

(56) References Cited

U.S. PATENT DOCUMENTS

| | | | |
|---|---|---|---|
| 638,215 A | 12/1899 | Condon | |
| 734,543 A | 7/1903 | Hadley | |
| 1,103,429 A | 7/1914 | Pitkin | |
| 1,255,484 A | 2/1918 | Stephens | |
| 1,862,299 A | 6/1932 | Ciccone | |
| 2,077,349 A | 1/1936 | Hobbis | |
| 2,272,447 A | 3/1941 | Traxel | |
| 2,584,918 A * | 2/1952 | Puig Salsas | 414/445 |
| 2,816,674 A | 12/1957 | Koontz | |
| 3,674,164 A * | 7/1972 | Kaufman | 414/450 |
| 3,760,964 A | 9/1973 | Trapp | |
| 3,941,399 A | 3/1976 | Peters et al. | |
| 4,084,706 A | 4/1978 | Russell | |
| 4,106,648 A | 8/1978 | Dickson | |
| 4,335,990 A * | 6/1982 | Apter et al. | 414/457 |

(Continued)

OTHER PUBLICATIONS

Hustler Drum Truck for Steel, Fiber, Wooden Drums, U.S. Plastic Corp.; http://www.usplastic.com/catalog/item.aspx?itemid=24433, downloaded on Jan. 20, 2011.

(Continued)

*Primary Examiner* — Anna Momper
*Assistant Examiner* — Ashley Romano
(74) *Attorney, Agent, or Firm* — Ostrolenk Faber LLP (57) ABSTRACT

A barrel truck has a handle structure; a wheeled support, the wheels spaced apart such that the wheels can slide under a barrel when the barrel is pivoted; a cradling member pivotally coupled to the support for engaging the perimeter of the barrel but not extending past the center line of the barrel; and an upright structure having a gripping mechanism for gripping the top of the barrel adapted to have a force applied thereto to exert an upward force on the barrel to pivot the barrel off the ground causing the wheeled support to move forward and pivot with respect to the cradling member, allowing the wheels on the wheeled support to move underneath the barrel, with further force on the handle structure lifting the barrel off the ground balanced over the wheels.

21 Claims, 8 Drawing Sheets

(56) References Cited

U.S. PATENT DOCUMENTS

| | | |
|---|---|---|
| 4,375,935 A | 3/1983 | Miller |
| 4,640,521 A | 2/1987 | Berfield |
| 4,653,765 A | 3/1987 | Smalley et al. |
| 4,741,659 A | 5/1988 | Berg |
| 4,902,187 A | 2/1990 | Rousseau |
| 5,042,962 A | 8/1991 | Lechnir |
| 5,678,976 A | 10/1997 | Rodriguez |
| 5,752,543 A | 5/1998 | Groening |
| 5,791,855 A | 8/1998 | Dixon |
| 6,244,603 B1 | 6/2001 | Rizzardi |
| 6,682,084 B2 | 1/2004 | Webster et al. |
| 6,851,684 B2 | 2/2005 | Krumm, Sr. et al. |
| 6,863,489 B2 | 3/2005 | Grubbs et al. |
| 7,004,482 B1 * | 2/2006 | Steffan ............ 280/47.17 |
| 7,281,720 B1 | 10/2007 | Richards |
| 8,413,999 B2 * | 4/2013 | Nassaux et al. ......... 280/47.2 |
| 2003/0011156 A1 | 1/2003 | Krumm, Sr. et al. |
| 2003/0129048 A1 | 7/2003 | Grubbs et al. |
| 2005/0081932 A1 * | 4/2005 | Sari et al. ............ 137/899 |
| 2005/0129491 A1 | 6/2005 | Smith |
| 2009/0314555 A1 | 12/2009 | Meyers |

OTHER PUBLICATIONS

MECO Hustler Drum Truck—68VR-4 Wheel Drum Trucks—Industrial Safety Cabinets; http://www.industrialsafetycabinets.com/MECO_Drum_Truck_p/mhdt.htm?1=1& . . . , downloaded on Jan. 20, 2011.

Optimal Handling Solutions, Drum Trucks; http://www.optimalhandling.com/Drum-Trucks-112.aspx downloaded on Aug. 13, 2010.

Drum Dispenser, Trucks & Dollie; httm://www.lkgoodwin.com/more_info/drum_dispenser_trucks_dollies/drum_dispenser_ . . . downloaded on Aug. 9, 2010.

Wesco Value Drum Carrier & Dispenser; http://www.wescomfg.com/html/drum_equipment/VDCD.htm downloaded Aug. 26, 2010.

Wesco Drum Trucks/Carriers/Dispensers brochure p. 8.

* cited by examiner

BARREL TRUCK

CROSS REFERENCE TO RELATED APPLICATIONS

This application claims the benefit of U.S. Provisional Application No. 61/547,929, filed Oct. 17, 2011, the entire disclosures of which are hereby incorporated by reference herein.

BACKGROUND OF THE INVENTION

This invention relates to barrel or drum trucks for handling and moving barrels or drums.

Barrel trucks are wheeled devices that are used to lift a barrel from the ground in order to move the barrel. The typical barrel truck has two wheels, straddles the barrel and has a gripping mechanism for grasping the barrel, typically at the top of the barrel, and, in particular, at the top rim or rib of the barrel. An example is shown in an advertisement for the DTC01 Universal Barrel Trolley from SDS Bespoke Handling Equipment. The known barrel truck is moved into position with the wheels along-side the barrel, straddling the barrel and a clamp clamps the barrel at the top rim of the barrel. The handles of the barrel truck or trolley are then pivoted downwardly to lift the barrel off the ground with the clamped barrel being held in the frame of the barrel truck above the ground allowing the user to wheel the barrel to a new position.

A problem with the known barrel truck is that the wheels straddle the barrel. Thus, if a number of barrels are lined up in close proximity to each other, the barrel truck cannot access a barrel that is in an interior line of such barrels without moving the other barrels.

Also, with standard drum trucks which tilt the drum resting the weight over the wheels, the operator must exert substantial force to initially tip the drum. This causes many back, shoulder, and arm injuries. The present invention reduces the amount of force needed, and will also reduce injuries using leverage instead of strength.

SUMMARY OF THE INVENTION

It is accordingly an object of the present invention to provide a barrel or drum truck that can engage and pick up a barrel even when other barrels are in close proximity without having to move the other barrels.

It is also an object of the invention to provide a barrel truck that can be used, if desired, so that the wheels straddle the barrel, by a convertibility feature, whereby the legs or wheels can be reversed.

It is also desired to provide a barrel truck which can be used to lift a plurality of barrels on a pallet.

BRIEF DESCRIPTION OF THE DRAWINGS

The invention will be described in the following detailed description which reference to the drawings in which.

DETAILED DESCRIPTION OF THE INVENTION

Figure 1:
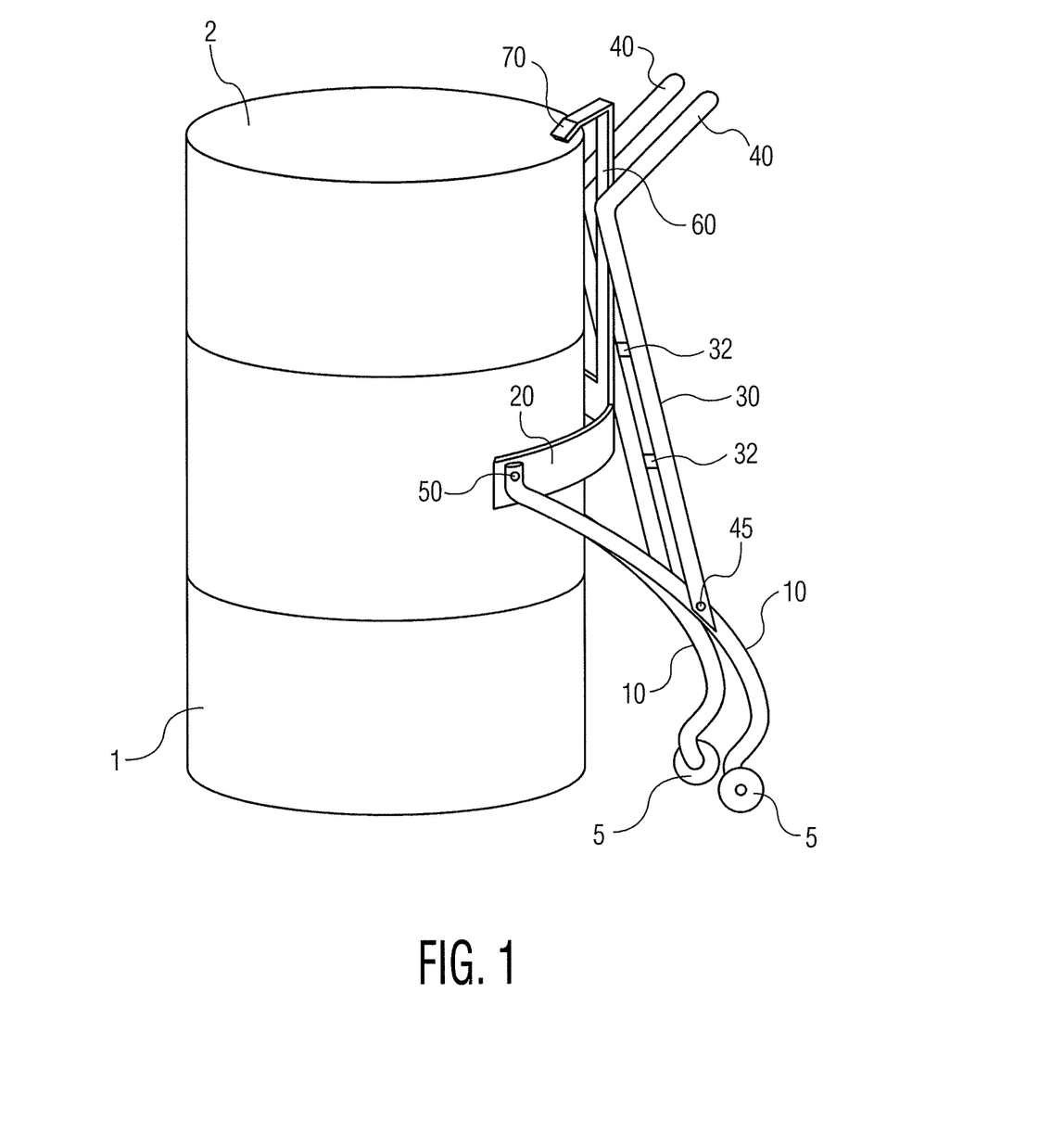
FIG. 1 shows a barrel and a barrel truck according to the invention in position ready to lift the barrel.

FIG. 1 shows the barrel truck according to the present invention in an initial orientation prior to lifting the barrel 1. As shown, the barrel truck includes two legs 10 which are designed so that they curve or bend forwardly and under the barrel when the barrel is picked up from the ground. A curved arm 20 provides a cradle for the barrel 1. The arm extends approximately one quarter way around the barrel. It preferably does not extend to the barrel center line but can if desired. A barrel truck handle structure 30 which has two handle arms 40 for grasping by a user is rigidly connected at 45 to the legs 10, for example, by welding, bolting or riveting or any other suitable means. Brackets or additional supports between structure 30 and legs 10 can be added for strength, as necessary. The legs 10 are connected at a pivot point 50 to the cradle arm 20. The arm 20 is connected to an upright shaft 60 which is preferably adjustable, to accommodate barrels of different heights. A gripping mechanism 70 is provided to grip the top of the barrel at the upper-most rib 2. Gripping mechanisms for accomplishing this are known in the art. See, for example, U.S. Pat. No. 2,272,447 or 4,902,187. Details of the gripping mechanism 70 are not shown. The gripping mechanism can also grip at the bottom of the drum using a well-known toe or toes at the bottom, in which case shaft 60 is extended down to the bottom. See U.S. Pat. No. 4,902,187. At the top, a beak-type grip can be used if only the top is gripped.

The handle structure 30 may include one or two handles 40, as shown. Structure 30 may be bolted to legs 10 at points 45 to allow legs 10 to be reversed, but can be welded or riveted if two types of drum trucks are sold separately, as explained below. When bolted, handle and leg should interlock together to prevent relative movement when downward pressure is applied to the handle to lift the drum. Suitable strengthening cross members 32 can be provided as needed.

The barrel truck has two wheels 5, preferably of relatively small outer diameter, so that they can be disposed under the barrel when the barrel is lifted. For example, the wheels may be 4"-6" in diameter or may be connected together by an axle. Other size wheels or casters can be used so long as they can go under the barrel when the barrel is tipped. Caster type wheels without an axle is preferred.

In operation, the user moves the barrel truck into the position shown in FIG. 1 against the barrel so that the curved arm 20 cradles the barrel. The arm 20 is curved so that it cradles the barrel approximately one quarter of the way around the barrel. It preferably does not extend to the barrel center line so that arm 20 will not interfere with other barrels disposed along-side the barrel being moved.

Figure 2:
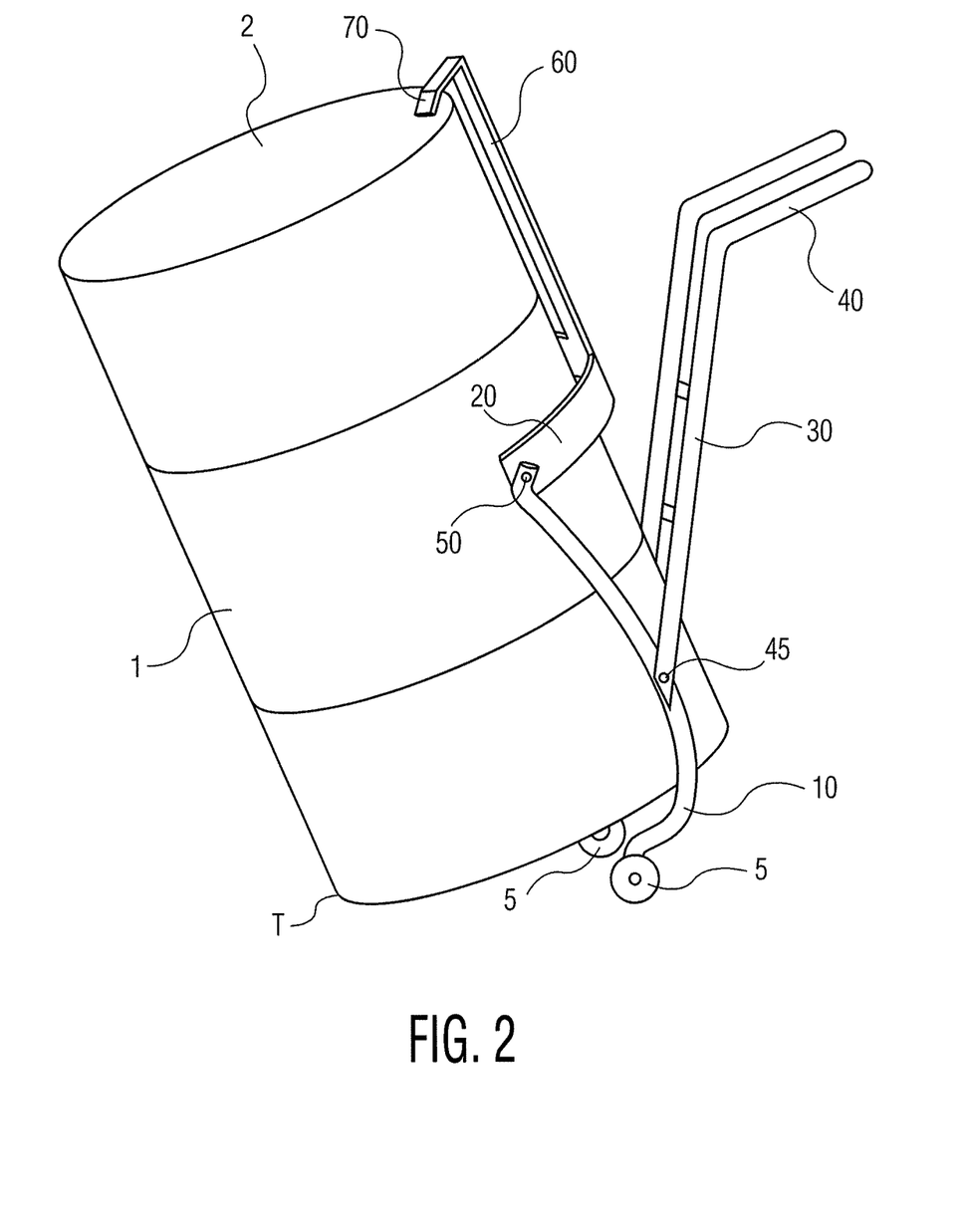
FIG. 2 shows the barrel truck and barrel with the barrel truck pivoting the barrel.

The user then pivots the handles 40 downwardly. See FIG. 2. Since the handle structure 30 is rigidly connected at the points 45 to the legs 10, the cradle arm 20 is firmly in engagement with the barrel, and the gripper 70 firmly grips the barrel at the top near the uppermost rib 2, the barrel pivots forwardly due to the leveraged downward motion of the handles 40 and the forward motion of the legs 10. The wheels 5 roll under the tipped barrel and attain the position shown in FIG. 2. The center of gravity of the barrel remains behind the tipping point T of the barrel so it will not tip over. Furthermore, with the user exerting downward force on the handles, the barrel will not tip over.

Once the wheels 5 are centered below the tipped barrel, the user then pivots the handles 40 further downwardly with the barrel suspended centered and balanced above the wheels 5 above the ground. See FIG. 3. The user can now wheel the barrel to any desired position.

Figure 3:
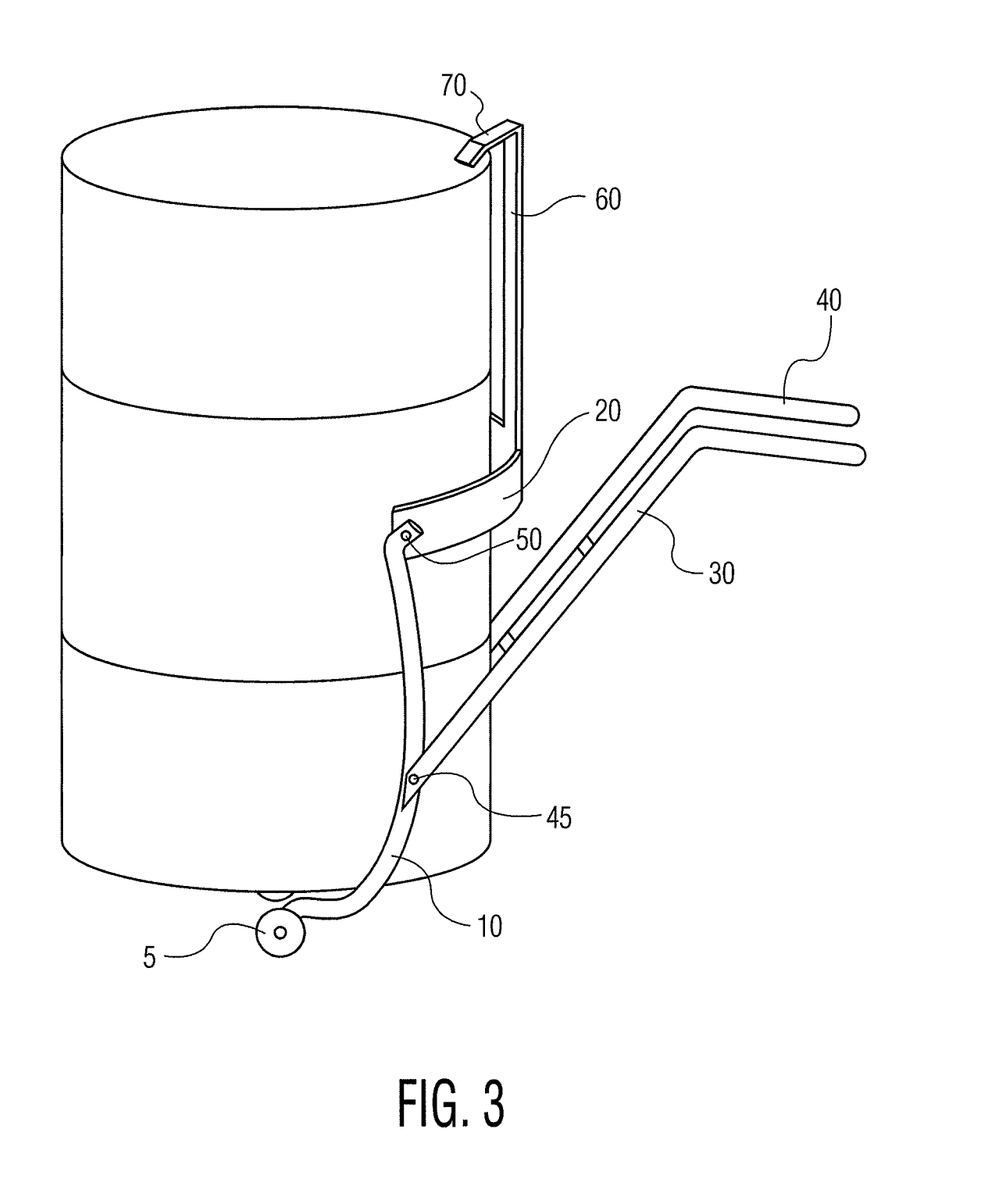
FIG. 3 shows the barrel truck with the barrel being held above the ground by the barrel truck allowing the barrel to be moved.

The present invention utilizes leverage to lift the barrel and tilt it forward to enable the wheels to be slid under the barrel. As shown in FIG. 3, the barrel balances level over the wheels 5.

Because the curved cradle arm 20 preferably only grips the barrel approximately a quarter of the way around the barrel and does not reach the center line of the barrel and further because the wheels go under the barrel, the present invention can be used to move barrels placed side by side. Furthermore, because the barrel truck of the present invention grips the barrel from the top, it fits all barrels and drums.

The barrel truck is preferably made to grip the barrel by gripper mechanism 70 in the standard way from the top lip of the barrel, making the barrel truck adapt to all size barrels and drums. The conventional way of gripping the drum from the top and bottom may also be used.

Figure 4:
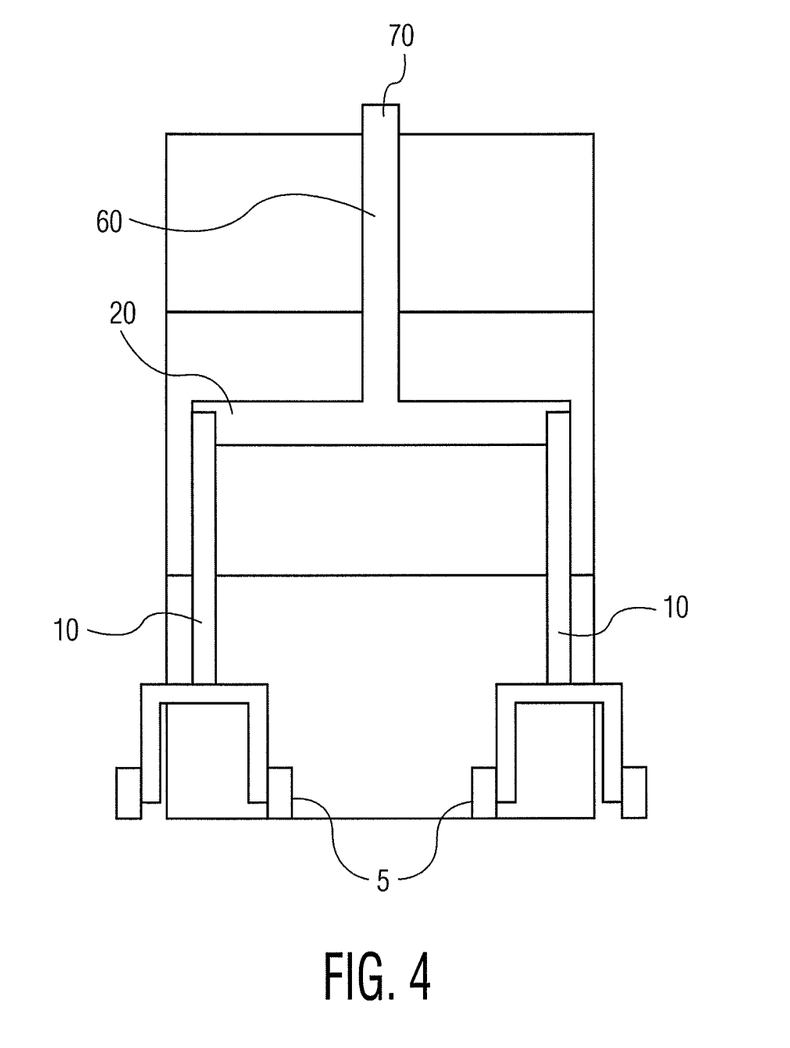
FIG. 4 shows the barrel truck in a rear view before lifting a barrel with the handle structure omitted for clarity and showing two alternative or reversible wheel arrangements, "A" for going under the barrel and "B" for straddling it.

As described, the legs 10 are curved or bent or dog-legged forwardly and inwardly at the bottom so that they go under the barrel and are positioned approximately at the center of the barrel to provide balance. See FIG. 3. The legs 10 can be curved, bent at an angle, or straight so long as the legs clear the bottom of the barrel and enable the wheels to move underneath the barrel. FIG. 4 shows the barrel truck and barrel in a rear view (handle structure 30 is omitted for clarity) when the barrel is lifted off the ground.

Figure 5:
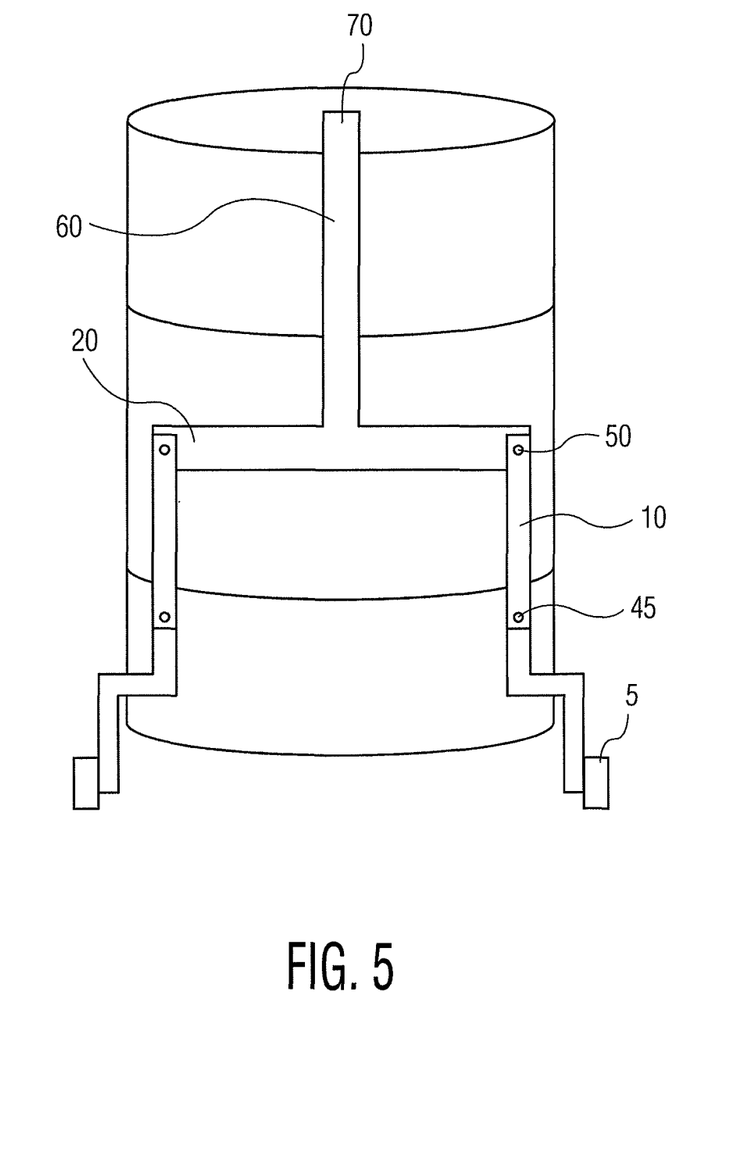
FIG. 5 shows the "B" set wheels configured to be used as a palletizer.
Figure 6:
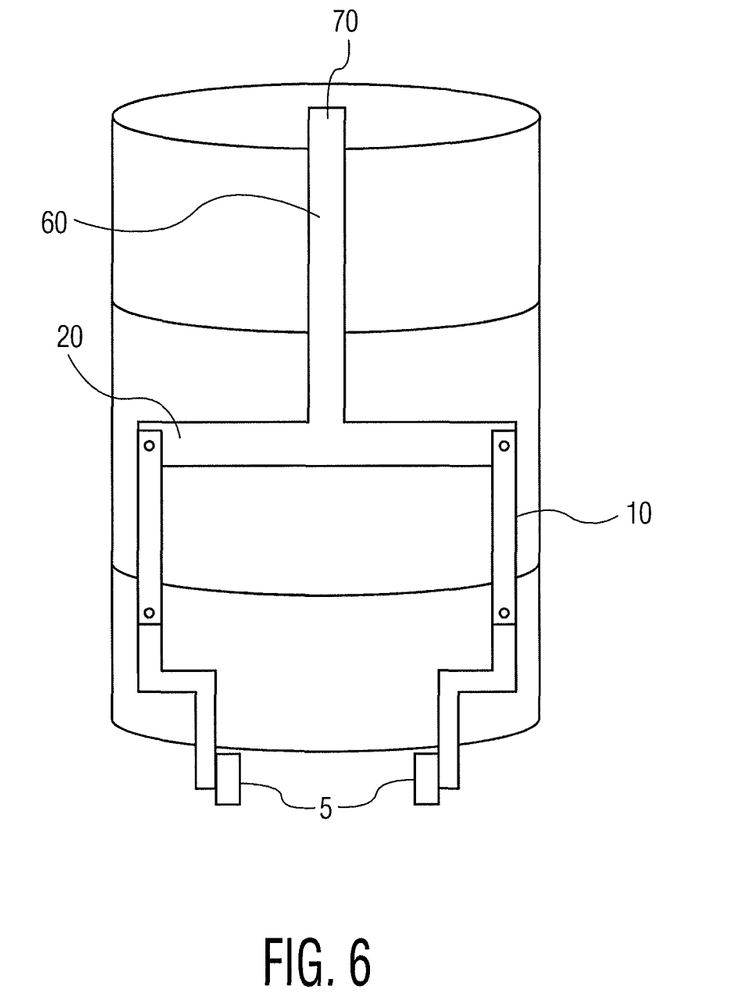
FIG. 6 shows the "A" set wheels with the barrel lifted.

FIG. 4 shows two sets of legs or wheels, an "A" set and a "B" set. The "A" set go under the drum and the "B" set are to be used as a palletizer. The "A" and "B" sets are the same, just reversed. They may be curved, bent or straight so long as they clear the bottom of the drum. The whole leg may be reversed, or just the bottom of the legs where the wheels are mounted. See FIG. 7. FIG. 5 shows the "B" set of wheels being used as a palletizer. FIG. 6 shows the "A" set of wheels that can go under the barrel.

Figure 7:
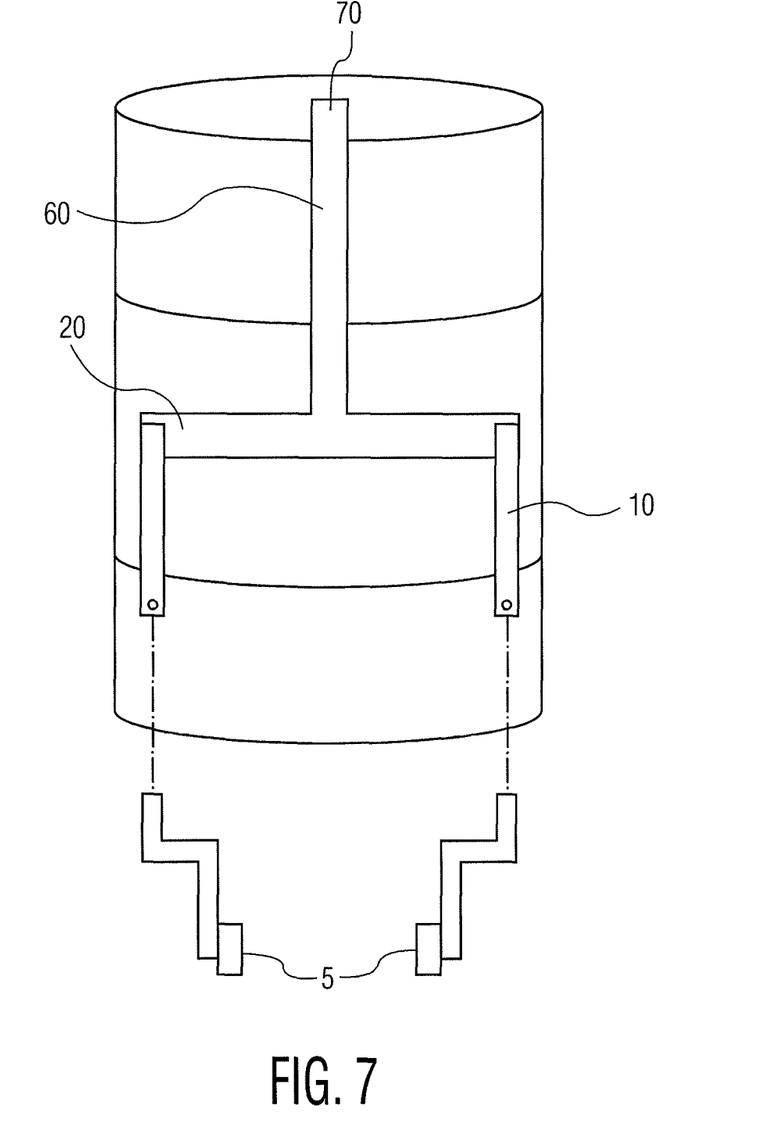
FIG. 7 shows how the wheels alone can be reversed to change between a barrel truck wherein the wheels go under the barrel and a palletizer wherein the wheels straddle the barrel.

According to are embodiment of the present invention, the legs 10 are preferably removably connected at the pivot point 50 to the cradle arm 20 and at 45 where the legs 10 attach to the handles 30. In this way, the left leg and the right leg can be interchanged so that the wheels 5 may be disposed so that they straddle the barrel, i.e., the bends in the legs allow the wheels 5, instead of going under the barrel, to go on the side of the barrel. In this way, by reversing the legs, the barrel truck can be used so that it straddles a barrel. This is useful where the barrel truck is being used as a palletizer lifting a barrel that is on a pallet where the wheels cannot go under the barrel. Furthermore, in this way, the barrel truck can be used to lift a plurality of barrels on a pallet (with the pallet). Used as a palletizer, caster type wheels, without an axle might be best used. Also, only the bottom of the legs where the wheels mount may be reversed as shown in FIG. 7.

Although reversible legs/wheels are shown, the barrel truck can also be constructed as two fixed models: An economy model with fixed legs for use on a palletizer, and an economy standard drum truck model with fixed legs/wheels that go under the drum. A deluxe model can have the reversible legs/wheels. Furthermore, as described, the legs can be reversed, in whole, from cradle arm to wheel or just the bottom of the legs with wheels can be reversed. See FIG. 7.

As described, there can be two sets of wheels that attach to the bottoms of the legs that would serve the same purpose, "A set" and "B set" (4 wheels). See FIG. 4. The "A set" may have an axle that connects both wheels (for example, 4") to go under the drum and a separate "B set" of casters (for example, 6") that fit into the legs and straddle the drum to act as a palletizer. See FIG. 5.

The shaft 60 should lock into the cradle arm 20 to enable ease of movement of the drum truck while approaching drums.

Figure 8:
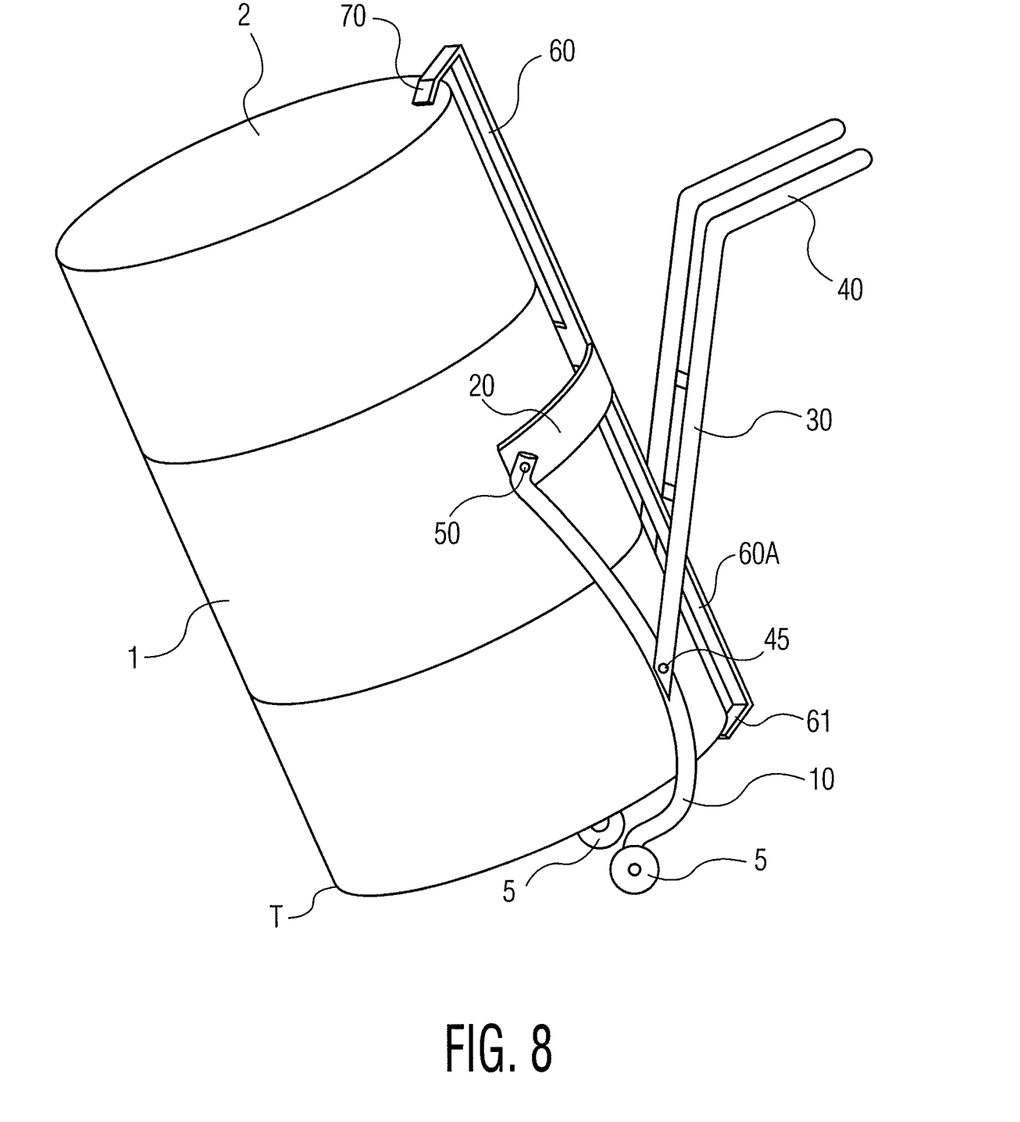
FIG. 8 shows an embodiment of the barrel truck with a bottom toe or toes.

FIG. 8 shows an alternative gripping mechanism that grips the barrel from the top and the bottom. The shaft 60 is lengthened to include a lower portion 60A with one or more toes 61 not go under the barrel. When the barrel is first tipped slightly, the toe or toes 61 go under the bottom lip of the barrel to support/grip it from the bottom.

The invention thus provides solutions to the need for a barrel truck that can move barrels that are lined up side-by-side and also provides a convertibility feature to allow it to be used as a palletizer or with barrels that are on a pallet.

What is claimed is:

1. A barrel truck for moving a barrel, the barrel having a bottom surface that is provided to be disposed adjacent the ground or other support surface, the barrel truck comprising:
   a handle structure;
   a wheeled support fixedly coupled to the handle structure, wheels of the support being structured and spaced apart on the support such that the wheels can roll beneath and under the bottom surface of the barrel to be lifted by the barrel truck when the barrel is pivoted in a direction away from the barrel truck;
   a cradling member pivotally coupled at a pivot to the wheeled support for engaging with a portion of the perimeter of the barrel but not extending past the center line of the barrel; and
   an upright structure coupled to the cradling member and having a gripping mechanism for gripping the barrel at the top of the barrel, the gripping mechanism adapted to have a force applied thereto to exert an upward force on the barrel to pivot the barrel off the ground or other support surface in the direction away from the barrel truck when a downward force is applied to the handle structure, causing the wheeled support to move forward and pivot about the pivot with respect to the cradling member, allowing the wheels on the wheeled support to move underneath the bottom surface of the barrel, with further force on the handle structure lifting the barrel off the ground or other support surface balanced over the wheels.

2. The barrel truck of claim 1, wherein the cradling member comprises a curved cradle arm for engaging the barrel, the upright structure being connected to the curved cradle arm and having the gripping mechanism whereby the gripping mechanism grips the barrel to allow the barrel to be pivoted, the wheeled support comprising two legs having a wheel at each lower end, the legs being pivotally coupled to the curved cradle arm.

3. The barrel truck of claim 2, wherein the legs have a bend near a bottom portion allowing the wheels to be disposed below the bottom surface of the barrel when the barrel is pivoted in the direction away from the barrel truck.

4. The barrel truck of claim 3, wherein the legs are formed such that they bend forwardly and inwardly to go under the bottom surface of the barrel.

5. The barrel truck of claim 3, wherein the wheels are coupled by an axle.

6. The barrel truck of claim 3, wherein the legs are removably coupled to the curved cradle arm allowing the legs to be reversed left and right thereby allowing the wheels to be disposed so that they straddle the barrel.

7. The barrel truck of claim 6, wherein reversing of the legs left and right allows the barrel truck to move a barrel that is disposed on a pallet.

8. The barrel truck of claim 3, wherein the wheels are mounted on structures that are removable from the legs to allow the structures to be reoriented thereby allowing the wheels to be disposed so that they straddle the barrel.

9. The barrel truck of claim 8, wherein the reorientation of the structures for the wheels allows the barrel truck to move a barrel that is disposed on a pallet.

10. The barrel truck of claim 8, wherein the reorientation of the structures for the wheels allow the wheels to be moved from a position wherein they go under the bottom surface of the barrel to a position wherein they straddle the barrel.

11. The barrel truck of claim 8, wherein the structures for the wheels are disposed at the bottoms of the legs.

12. The barrel truck of claim 3, wherein the wheels are caster type wheels.

13. The barrel truck of claim 12, wherein the wheels are caster type wheels that are not connected together by an axle.

14. The barrel truck of claim 2, wherein the curved cradle arm extends approximately one-quarter way around the perimeter of the barrel.

15. The barrel truck of claim 2, wherein the curved cradle arm extends approximately ¼ to ½ way around the perimeter of the barrel.

16. The barrel truck of claim 1, wherein the handle structure comprises two handles to be grasped by a user for providing leverage to the wheeled support to pivot the barrel and move the wheels under the bottom surface of the barrel.

17. The barrel truck of claim 1, wherein a downward motion on the handle structure causes the pivoting of the barrel and lifts the barrel from the ground.

18. The barrel truck of claim 17, wherein the barrel, when lifted off the ground, is approximately balanced centered over the wheels.

19. The barrel truck of claim 1, further comprising a toe at the bottom of the upright structure for engaging the bottom of the barrel.

20. The barrel truck of claim 1, wherein the gripping mechanism comprises a beak grip.

21. A hand truck for moving an object, the object having a bottom surface that is provided to be disposed adjacent the ground or other support surface, the hand truck comprising:
a handle structure;
a wheeled support fixedly coupled to the handle structure, wheels of the support being structured and spaced apart on the support such that the wheels can roll beneath and under the bottom surface of the object to be lifted by the hand truck when the object is pivoted in a direction away from the hand truck;
a cradling member pivotally coupled at a pivot to the wheeled support for engaging with a portion of the perimeter of the object but not extending past the center line of the object; and
an upright structure coupled to the cradling member and having a gripping mechanism for gripping the object at the top of the object, the gripping mechanism adapted to have a force applied thereto to exert an upward force on the object to pivot the object off the ground or other support surface in the direction away from the hand truck when a downward force is applied to the handle structure, causing the wheeled support to move forward and pivot about the pivot with respect to the cradling member, allowing the wheels on the wheeled support to move underneath the bottom surface of the object, with further force on the handle structure lifting the object off the ground or other support surface balanced over the wheels.

* * * * *